United States Patent Office 2,758,111
Patented Aug. 7, 1956

2,758,111

NEW OXYCELLULOSES AND PREPARATION THEREOF

Curt B. Roth, Binghamton, N. Y., assignor to Hercules Powder Company, Wilmington, Del., a corporation of Delaware No Drawing. Application December 18, 1952, Serial No. 326,774

12 Claims. (Cl. 260—212)

This invention relates to a new oxycellulose and its preparation and, more particularly, to a process of oxidizing cellulose whereby a cellulosic containing an aldehyde group in the 6-position is obtained.

Carbonyl-containing oxycelluloses have been produced by the oxidation of cellulose with various oxidative reagents, but in every case, carbonyl groups, if present, have been produced by the oxidation of the secondary hydroxyls in the 2- and/or 3-positions or in scission of the cellulose chain-molecules. For example, chromic acid and hypohalite oxidations of cellulose produce oxycelluloses containing large amounts of carboxyl and aldehyde groups but at the same time only with a great amount of chain scission. Periodate and lead tetraacetate oxidations cleave the glucose ring during the oxidation, the secondary hydroxyls in the 2- and 3-positions having been oxidized. In the case of nitrogen dioxide, it is well-recognized that the main reaction is the oxidation of the primary hydroxyl group in the 6-position to the carboxyl group. Any carbonyl groups present in such oxycelluloses are ketone groups in the 2- and/or 3-position with the possibility of some aldehyde groups in the 2- and 3-positions with rupture of the ring. In no case has an oxycellulose been produced wherein a carbonyl group is present in the 6-position.

Now, in accordance with this invention, it has been found that the primary alcohol group in position 6 of cellulose or a partially substituted cellulose may be preferentially oxidized to the aldehyde group, with no ring opening and no appreciable degradation of the cellulose molecule, by oxidizing the cellulose or partially substituted cellulose in an inert organic solvent with an acidic anhydrous solution of tert-butyl chromate.

The following examples will illustrate the preparation of 6-aldehydo-oxycelluloses in accordance with this invention. All parts and percentages are by weight unless otherwise indicated.

Example 1

A solution of tert-butyl chromate was prepared by adding 75 parts of chromium trioxide in small increments to a solution of 430 parts of tert-butyl alcohol in 1320 parts of absolute thiophene-free benzene with cooling as required to hold the temperature at or below room temperature and adding 250 parts of anhydrous sodium sulfate to eliminate the water formed during the reaction. The solution was then filtered and concentrated under vacuum at 40° C. to a concentration of about 10% tert-butyl chromate to remove the excess butyl alcohol and then was stored at 0°–3° C.

Five parts of cotton linters was pretreated at 23° C. with 1.90 parts of glacial acetic acid. After 24 hours, a mixture of a portion of the above tert-butyl chromate solution (equal to 14.2 parts of tert-butyl chromate), 20 parts of glacial acetic acid, and 1 part of acetic anhydride was added and the immersed cellulose was held at 23° C. for 5 days. The product was filtered from the excess reagent liquid, washed successively with benzene, a 10:1 mixture of benzene and methanol, and finally was extracted with benzene until the extract was colorless. The product was then slurried for 16 hours at room temperature with 250 parts of an aqueous 10% solution of oxalic acid to hydrolyze the chromium complex. The slurry was filtered and the product was extracted with water. The oxycellulose so obtained was white and retained its fibrous structure. On analysis it was found to have a copper number of 17.6, to contain 0.282 milliequivalent of carboxyl groups per g. of cellulose, and to have an elementary analysis of 43.94% carbon and 6.42% hydrogen, whereas the starting material had a copper number of 0.25, contained 0.077 mequiv. COOH/g. cellulose and 44.26% carbon and 6.42% hydrogen. The 6-aldehydooxycellulose, therefore, contained 225 aldehyde groups per 1000 glucose units (as calculated from the copper number) and 45.6 carboxyl groups per 1000 glucose units (as calculated from the mequiv./g. cell.) in comparison with 3.2 and 12.5, respectively, for the original cellulose.

Example 2

Five parts of cotton linters was pretreated with 1.9 parts of glacial acetic acid for 24 hours, after which a mixture of the tert-butyl chromate solution prepared as described in Example 1 (an amount equal to 14.2 parts of tert-butyl chromate), 20 parts of glacial acetic acid, and 1 part of acetic anhydride was added at room temperature. The reaction mixture was allowed to stand for 7 days at room temperature and then was filtered. The brown cellulosic product so obtained was washed 6 times with water, extracted with benzene until the extract was colorless, again washed with water, and then agitated with 300 parts of a 10% aqueous oxalic acid solution for 48 hours at room temperature. The oxidized cellulose, separated from the oxalic acid solution by filtration, was white and retained its fibrous structure. It had a copper number of 19.8, contained 0.336 mequiv. COOH/g. cellulose and 43.95% carbon and 6.38% hydrogen. The 6-aldehydooxycellulose, therefore, contained 252 aldehyde groups per 1000 glucose unit and 54.2 carboxyl groups per 1000 glucose units.

Example 3

Five parts of cotton linters was treated with the tert-butyl chromate solution as described in Example 2 above except that the reaction mixture was allowed to stand for 11 days at room temperature. The oxycellulose so obtained was filtered from the excess reagent and washed successively with benzene, methanol, and water. The chromium complex was hydrolyzed by agitating the oxycellulose in 300 parts of a 10% aqueous oxalic acid solution for 17 hours at 78° C. The product was then washed with distilled water and dried over phosphorus pentoxide in vacuo. The white oxycellulose had a copper number of 19.3 and contained 0.281 mequiv. COOH/g. cellulose, 43.75% carbon and 6.38% hydrogen. The 6-aldehydo-oxycellulose, therefore, contained 245 aldehyde groups per 1000 glucose units and 45.4 carboxyl groups per 1000 glucose units.

Example 4

Five parts of cotton linters was pretreated with 1.9 parts of glacial acetic acid for 2 days at room temperature, after which a mixture of the tert-butyl chromate solution prepared as described in Example 1 (an amount equal to 14.2 parts of tert-butyl chromate), 20 parts of glacial acetic acid, and 1 part of acetic anhydride was added. The reaction mixture was allowed to stand at room temperature for 6 days. The oxycellulose was filtered from the excess reagent and then washed successively with benzene, methanol, and water. The brown product was heated for 5 hours at 75° C. in 300 parts of a 10% solution of oxalic acid. The slurry was filtered and the oxycellulose was washed with water and methanol and then dried at room temperature over phosphorus pentoxide in vacuo. The white product had a copper number of 18.9 and contained 0.337 mequiv. COOH/g. cellulose. A direct oxygen determination showed it to contain 49.94% oxygen. Thus, the 6-aldehydo-oxycellulose contained 240 aldehyde groups per 1000 glucose units and 54.4 carboxyl groups per 1000 glucose units.

*Example 5*

Five parts of cotton linters was pretreated with 1.9 parts of glacial acetic acid at room temperature for 48 hours. A mixture of the tert-butyl chromate solution, prepared as described in Example 1, in an amount equal to 14.2 parts of tert-butyl chromate, with 20 parts of glacial acetic acid and 1 part of acetic anhydride was then added to the pretreated cellulose. The slurry was held at room temperature for 25 days and then was heated at 60° C. for 5.5 hours. The cellulose reaction product was removed by filtration, washed successively with benzene, methanol, and water, and then was heated for 5 hours at 75° C. with 300 parts of a 10% aqueous oxalic acid solution. The oxycellulose when separated from the oxalic acid solution by filtration and washed was a white, fibrous material. It had a copper number of 21.9 and contained 0.406 mequiv. COOH/g. cellulose. The 6-aldehydo-oxycellulose so produced contained 279 aldehyde groups per 1000 glucose units and 65.5 carboxyl groups per 1000 glucose units.

*Example 6*

Five parts of cotton linters was pretreated with 1.90 parts of glacial acetic acid at room temperature for 30 days. To this pretreated cellulose was added a mixture of an oxidation solution prepared as described in Example 1 (an amount equal to 42.2 parts of tert-butyl chromate, 51 parts of glacial acetic acid, and 2.6 parts of acetic anhydride. The slurry was heated to 70° C. for 24 hours. The brown product was filtered off, washed successively with benzene, methanol, and water and then was immersed in 300 parts of aqueous 10% oxalic acid and heated to 70°–75° C. for 4.25 hours. The white, fibrous product was filtered off, washed with water and dried. On analysis it had a copper number of 21.6 and contained 0.400 mequiv. COOH/g. cellulose, whereas the starting cellulose had a copper number of 0.08 and contained 0.004 mequiv. COOH/g. Thus this 6-aldehydo-oxycellulose contained 278 aldehyde groups per 1000 glucose units and 64.81 carboxyl groups per 1000 glucose units against 1.0 and 0.648, respectively, for the starting cellulose.

*Example 7*

Five parts of a hydroxyethyl cellulose having a degree of substitution of 0.39 was pretreated with 4.0 parts of glacial acetic acid for 5 days at room temperature. It was then oxidized with tert-butyl chromate exactly as the pretreated cotton in Example 6. The white, fibrous product so obtained had a copper number of 9.73 and contained 0.14 mequiv. COOH/g. The corresponding values for the hydroxyethyl cellulose starting material were 0.94 and 0.007, respectively. Thus, the product contained 125 aldehyde groups per 1000 glucose units and 23 carboxyl groups per 1000 glucose units as against 12 and 1, respectively, for the starting material.

*Example 8*

Five parts of carboxymethylcellulose having a degree of substitution of 0.39 was preheated and oxidized by the same procedure described in Example 7 for hydroxyethyl cellulose. In this case the product was isolated from the reaction slurry by filtration and then was washed with anhydrous benzene. To eliminate the sodium and chromium ions (salts), the product was washed by downward replacement with 3000 parts of a cold concentrated hydrochloric acid-methanol mixture (20:20 by volume). The acid was then washed away with 200 parts of water, after which the product was heated in 300 parts of an aqueous 10% oxalic acid solution for 4 hours at 75° C. The white product was then filtered off, washed by downward replacement with 2000 parts of a methanol-water mixture (7:3 by weight) and dried. The 6-aldehydo-oxycarboxymethylcellulose so obtained had a copper number of 10.8 and contained 0.44 mequiv. COOH/g. whereas these values for the starting material were <1 and 0.02, respectively. Thus, the product contained 139 aldehyde groups and 72 carboxyl groups per 1000 glucose units in comparison with 13 and 3.3, respectively, for the starting carboxymethylcellulose.

Any cellulose or partially substituted cellulose derivative that is incompletely substituted in position 6 may be used for the preparation of the 6-aldehydo-oxycellulose of this invention. While the foregoing examples have shown the preparation of 6-aldehydo-oxycellulose from cotton linters, any other cellulose furnished may be used, as, for example, wood pulp cellulose, hydrocellulose, straw cellulose, etc. In addition, partially substituted celluloses may be used, as, for example, carboxymethylcellulose, carboxyethyl cellulose, hydroxyethyl cellulose, sulfoethyl cellulose, ethyl cellulose, cellulose acetate, cellulose propionate, etc., provided that the hydroxyl in position 6 is incompletely substituted. In the case of a partially substituted hydroxyethyl cellulose, oxidation may take place on either or both of the primary alcohol groups, i. e., the primary alcohol group of the hydroxyethyl group as well as the primary alcohol group in the 6-position. The cellulose or partially substituted cellulose is preferably pretreated, as, for example, with acetic acid, to increase the rate of reaction but unpretreated cellulose or cellulose derivatives may be used.

The oxidative reagent used to produce the 6-aldehydo-oxycelluloses of this invention is an ester of chromic acid acidified with an organic acid. Unlike chromic acid or chromic oxide, acidic solutions of a chromic acid ester will preferentially oxidize the primary alcohol, i. e., the hydroxyl in the 6-position, of cellulose to an aldehyde group without rupture of the anhydroglucose ring or scission of the cellulose chain. Chromic acid esters that will so function are the esters of chromic acid and secondary or tertiary alcohols such as isopropyl alcohol, tert-butanol, tert-amyl alcohol, etc. The chromic acid ester of tert-butanol is preferred because it is more stable than isopropyl chromate and more active than tert-amyl chromate.

These chromic acid esters are prepared by reacting chromic oxide with the alcohol. Since the reaction is slightly exothermic, and also to avoid any danger of explosion due to decomposition of the ester which may occur at temperatures above about 70° C., the reaction is usually carried out at temperatures within the range of from about −10° C. to about 70° C. A very convenient method of preparing the chromic acid ester is to add chromic oxide to a solution of the alcohol in an inert solvent. After removing water formed in the reaction, the solution of chromic acid ester may then be used directly for the oxidation of cellulose in accordance with this invention. Inert solvents that may be used for the preparation of the chromic acid ester and as the media for the cellulose oxidation are aliphatic, cycloaliphatic, and aromatic hydrocarbons such as hexane, cyclohexane, benzene, toluene, etc., or commercial mixtures of hydrocarbons such as the petroleum ethers, gasoline, etc., or chlorinated hydrocarbons such as chloroform, carbon tetrachloride, etc. As already pointed out, the water formed in the reaction should be removed, and this may be done by any convenient means, as, for example, by the use of anhydrous sodium sulfate, azeotropic distillations, etc. In addition, the excess alcohol should be removed by distillation, etc., prior to the addition of the organic acid required for the cellulose oxidation reaction.

In carrying out the reaction in accordance with this invention, the cellulose or partially substituted cellulose is mixed with a solution of the chromic acid ester, which has previously been acidified, with an organic acid. Any organic acid may be used but preferably the acid is an alkanoic or haloalkanoic acid, as, for example, acetic acid, propionic acid, chloracetic acid, dichloracetic acid, trichloracetic acid, etc. The amount of acid used may be varied over a wide range but preferably will be an amount within the range of from about 0.1% to about 20% of the total oxidation solution. Higher amounts of acid may be used if desired.

The amount of chromic acid ester added to the cellulosic starting material will depend upon the degree of oxidation desired, i. e., the number of aldehyde groups desired per 1000 glucose units. For a maximum number of aldehyde groups per 1000 glucose units, a two- or three-fold excess is used. The exact composition of the oxidation complex, i. e., the solution of chromic acid ester, is not known. Hence, the oxidative power present in the reaction mixture is more accurately expressed by the number of free oxygens present per glucose unit as measured by titration with sodium thiosulfate or other suitable means than by moles of chromic acid ester per glucose unit of cellulose. In general, an amount of the solution of chromic acid ester as will provide from about one free oxygen to an excess of about five free oxygens per glucose unit of the cellulose or partially substituted cellulose will be used. The concentration of the chromic acid ester in the solution added to the cellulose may, of course, be varied over a wide range. The reaction may be carried out in the absence of a diluent, if desired, but handling of the viscous chromic acid ester is difficult and a uniform reaction with the cellulose is less easily attained. There is also less danger from explosion when the reaction is carried out in the presence of an inert solvent. In general, a concentration of from about 10% to about 25% of the chromic acid ester in the oxidation reagent solution is most convenient for the oxidation process of this invention.

The reaction between the cellulose and chromic acid ester is readily carried out at room temperature. Lower temperatures may be used but temperatures above about 70° C. are not recommended since the chromic acid esters decompose readily at such temperatures and there would then be danger of explosion at such temperatures. In general, a temperature of from about 20° C. to about 70° C. is used. The time required for the reaction will depend upon the degree of oxidation desired, the temperature at which the reaction is carried out, whether a pretreated or unpretreated cellulose was used, etc. Thus, the time may vary from several days at a low temperature to a few hours at an elevated temperature.

When the oxidation has proceeded to the desired degree, the chromium complex which is formed may be hydrolyzed and at the same time any unreacted chromic acid may be reduced by the addition of water and a reducing acid such as oxalic acid, tartaric acid, citric acid, etc., or by the addition of a solution of a reducing agent such as hydrazine sulfate, etc. This hydrolysis reaction may be carried out by agitating the oxycellulose with an aqueous solution of the oxalic acid, or other agent, at room temperature for several hours or by heating it at elevated temperatures. In general, it is carried out at a temperature of from about 20° C. to about 75° C.

The 6-aldehydo-oxycelluloses obtained in accordance with this invention are white, fibrous products which are stable when stored in the absence of oxygen and in the dark. However, when 6-aldehydo-oxycellulose was allowed to stand for several months in air at room temperature and in light, some oxidation of the aldehyde groups to carboxyl groups did take place. They not only differ from the prior art oxycelluloses in that the primary alcohol group has been oxidized to an aldehyde group but also in that the ratio of carboxyl to carbonyl groups is lower. The number of aldehyde groups present in these products may be varied over a wide range, from a few per 1000 glucose units to the theoretical maximum of 1 per glucose unit. In general, for these products to exhibit to any appreciable extent the aldehydo characteristics, they should contain at least about 75 aldehyde groups per 1000 glucose units, and preferably at least about 100 aldehyde groups per 1000 glucose units.

The process of this invention is of value in that this oxidation procedure makes possible the activation of the cellulose molecule and the production of a cellulose molecule containing mainly aldehyde groups. The 6-aldehydo-oxycelluloses will undergo the reactions typical of aldehydes and, hence, provide a new way of introducing substituents into the cellulose molecule. The aldehyde group will react with nitrogen-, halogen-, and phosphorus-containing compounds, as, for example, halogen, ammonia, amines, urea, thiourea, phosphorus compounds, etc. A practical use of these new products is in the preparation of a fabric which would be susceptible to further chemical reactions, as, for example, in the application of surface coatings and finishes by means of cross-linking reactions.

What I claim and desire to protect by Letters Patent is:

1. The process of preparing an oxycellulose containing aldehydo groups in the 6-position which comprises contacting cellulose with a solution of tert-butyl chromate and acetic acid.

2. The process of preparing an oxycellulose containing aldehydo groups in the 6-position which comprises contacting cellulose with a solution of tert-butyl chromate and acetic acid in an inert solvent at a temperature of from about 20° C. to about 70° C.

3. The process of preparing an oxycellulose containing aldehydo groups in the 6-position of hydroxyethyl cellulose which comprises contacting a hydroxyethyl cellulose containing free hydroxyls in the 6-position with a solution of tert-butyl chromate and acetic acid in an inert solvent at a temperature of from about 20° C. to about 70° C.

4. The process of preparing an oxycellulose containing aldehydo groups in the 6-position of carboxymethylcellulose which comprises contacting a carboxymethylcellulose containing free hydroxyls in the 6-position with a solution of tert-butyl cromate and acetic acid in an inert solvent at a temperature of from about 20° C. to about 70° C.

5. An oxycellulose containing aldehydo groups in the 6-position, said oxycellulose containing at least about 75 aldehydo groups per 1000 glucose units.

6. An oxy-carboxymethylcellulose containing aldehydo groups in the 6-position, said oxy-carboxymethylcellulose containing at least about 75 aldehydo groups per 1000 glucose units.

7. The process of preparing an oxycellulose containing aldehydo groups in the 6-position which comprises contacting one of the group consisting of cellulose, and hydroxyalkylcelluloses and carboxyalkylcelluloses which contain free hydroxyls in the 6-position, with a mixture of an alkyl chromate and an organic acid, said alkyl chromate being selected from the group consisting of isopropyl, tert-butyl, and tert-amyl chromates and said organic acid being selected from the group consisting of acetic, propionic, chloracetic, dichloracetic, and trichloracetic acids.

8. The process of preparing an oxycellulose containing aldehydo groups in the 6-position which comprises contacting cellulose with a mixture of an alkyl chromate and an organic acid, said alkyl chromate being selected from the group consisting of isopropyl, tert-butyl, and tert-amyl chromates and said organic acid being selected from the group consisting of acetic, propionic, chloracetic, dichloracetic, and trichloracetic acids.

9. The process of preparing an oxycellulose containing aldehydo groups in the 6-position which comprises contacting a hydroxyalkylcellulose containing free hydroxyls in the 6-position with a mixture of an alkyl chromate and an organic acid, said alkyl chromate being selected from the group consisting of isopropyl, tert-butyl, and tert-amyl chromates and said organic acid being selected from the group consisting of acetic, propionic, chloracetic, dichloracetic, and trichloracetic acids.

10. The process of preparing an oxycellulose containing aldehydo groups in the 6-position which comprises contacting a carboxyalkylcellulose containing free hydroxyls in the 6-position with a mixture of an alkyl chromate and an organic acid, said alkyl chromate being selected from the group consisting of isopropyl, tert-butyl, and tert-amyl chromates and said organic acid being selected from the group consisting of acetic, propionic, chloracetic, dichloracetic, and trichloracetic acids.

11. An oxycellulose selected from the group consisting of an oxycellulose containing aldehydo groups in the 6-position, an oxyhydroxyalkylcellulose containing aldehydo groups in the 6-position, and an oxycarboxyalkylcellulose containing aldehydo groups in the 6-position, there being at least about 75 aldehydo groups per 1000 glucose units in said oxycelluloses.

12. An oxyhydroxyalkylcellulose containing aldehydo groups in the 6-position, said oxyhydroxyalkylcellulose containing at least about 75 aldehydo groups per 1000 glucose units.

References Cited in the file of this patent

"Journal of Textile Institute" (Clibbens et al.) 18, T143–T147 (1927).

"Cellulose and its Derivatives" (Ott), (1943), (page 179 relied on).

Oppenauer et al.: Chem. Abstracts, 44, 3871 (1950).

"Textile Research Journal," 21, pages 143–8 (1951).